United States Patent [19]

Williams

[11] 4,274,669
[45] Jun. 23, 1981

[54] PICK-UP TOOL FOR OBJECTS

[76] Inventor: Curtis Williams, 200 Center Plz., Tulsa, Okla. 74119

[21] Appl. No.: 86,824

[22] Filed: Oct. 22, 1979

[51] Int. Cl.³ .............................................. B65G 7/12
[52] U.S. Cl. .................................................... 294/16
[58] Field of Search ................. 294/16, 31, 62, 103 R, 294/1 R, 15, 26, 29, 104, 50.9; 224/45 J, 45 K

[56] References Cited

U.S. PATENT DOCUMENTS

| | | | |
|---|---|---|---|
| 2,784,026 | 3/1957 | Thiel, Jr. | 294/16 |
| 3,195,380 | 7/1965 | Bicks | 294/16 |
| 3,261,634 | 7/1966 | Hewson | 294/16 |

FOREIGN PATENT DOCUMENTS 753383  8/1956  United Kingdom ................... 294/50.9

Primary Examiner—James B. Marbert
Attorney, Agent, or Firm—Head & Johnson

[57] ABSTRACT

A hand operated pick-up tool for selectively engaging a quantity or stack of cards, particularly for removal thereof from a filing drawer, or the like, and comprising a first L-shaped gripper member, a second L-shaped gripper member slidably and pivotally secured to the first gripper member and cooperating therewith for engaging the exposed opposite faces of the selected stack of cards, wedging apparatus cooperating between the two gripper members for securely clamping the engaged cards therebetween, and a handle member provided for one of the gripper members for facilitating manipulation of the tool.

5 Claims, 2 Drawing Figures

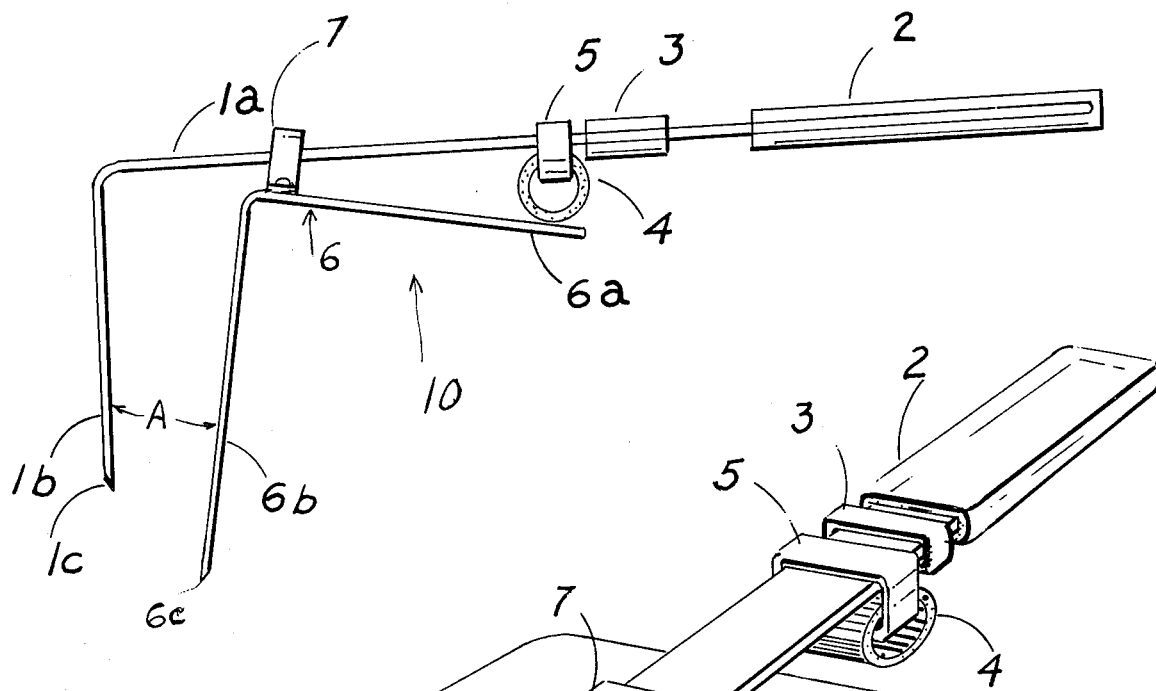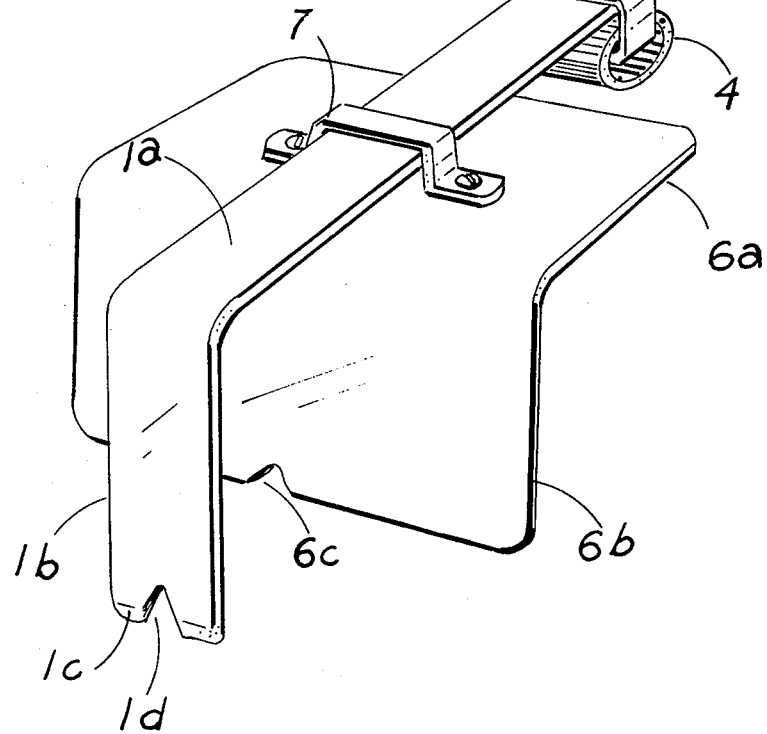

PICK-UP TOOL FOR OBJECTS

BACKGROUND OF THE INVENTION

1. Field of the Invention

This invention relates to improvements in gripping tools and more particularly, but not by way of limitation, to a gripping tool for engaging a selected quantity of cards for simultaneous movement of the quantity of cards from one position to another.

2. Description of the Prior Act

Pliers and other gripping tools are well known and have been in widespread use for many years, and most of these tools comprise lever members pivotally secured together and carrying complementary gripping jaws at one end thereof whereby squeezing of the lever members together applies a gripping force to the jaws for engaging and holding an article or element. Additionally, a tool has been devised for facilitating the manipulating of an ice cream can lifter and which comprises a pair of L-shaped grippers pivotally connected in the proximity of the corners thereof to provide handles or levers and inner and outer laws. The jaws of this tool are provided with inwardly projecting teeth on at least one of the jaw members for biting into the wall of the ice cream can to assure an efficient engagement of the can in order that the can may be manipulated as required. The overall characteristic of the ice cream can lifter, as well as other well known gripping tools includes pivotal lever or handle elements dependent upon a squeezing action for manipulating of the gripping jaws, and one particular disadvantage of this type operation is the width or size of the object or load which may be embraced by the jaws, and the lack of adjustability of the bite of the jaws.

SUMMARY OF THE INVENTION

The present invention contemplates a novel tool for retrieving or picking up cards, such as computer cards or the like, and which is particularly designed and constructed for overcoming the foregoing disadvantages. The novel tool comprises a pair of substantially flat gripping elements adapted for simultaneously engaging the outer or exposed faces of a stack of cards, or the like, and movable alternately toward and away from each other in order to firmly grasp the cards for manipulation thereof, and subsequently releasing the cards for suitable disposition thereof, as desired. One of the gripping elements is provided with an elongated handle portion extending substantially perpendicularly from the planar surfaces thereof, and the other of said gripping elements is provided with a perpendicularly arranted press plate which is pivotally and slidably secured to the handle portion of the first gripping element. A wedging means is adjustably interposed between the handle member and the press plate for pivoting of one of the gripping elements in order to regulate the pressure of the gripping elements against the engaged cards during manipulation thereof. The flat engaging surfaces of the gripping elements in combination with the adjustable wedging means provides a readily useable tool for lifting or otherwise manipulating a plurality of stack of adjacent cards, or the like. The novel tool is simple and efficient in operation and economical and durable in construction.

BRIEF DESCRIPTION OF THE DRAWINGS

FIG. 1 is a side elevational view of a card manipulating tool embodying the invention.

FIG. 2 is a perspective view of a card manipulating tool embodying the invention.

DESCRIPTION OF THE PREFERRED EMBODIMENT

Referring to the drawings in detail, reference numeral 10 generally indicates a tool comprising a first gripping element 1 of substantially L-shaped configuration and having a first elongated leg member 1a disposed substantially perpendicularly with respect to a second leg member 1b. The legs 1a and 1b are preferably integral and constructed from a suitable flat material, such as strap metal, plastic, or the like, whereby at least the outer or exposed surface of the leg 1b is planar, as particularly shown in FIG. 2 to provide a gripping jaw for the tool 10. In addition, the outer end of the leg 1b is preferably beveled or sharpened as shown at 1c for facilitating inserting of the leg 1b between a pair of adjacent cards (not shown) in a plurality of cards, as will be hereinafter set forth. It is also preferable to provide a recess or notch 1d in the outer end of the leg 1b for facilitating retrieval of a group of related cards (not shown) which might be secured in a bundle, by a rubber band, string, or the like (not shown). The outer end of the leg 1a is preferably provided with a suitable cover member 2 providing a handle for facilitating manipulation of the tool 10. A collar member 3 may be slidably secured to the leg 1a inboard of the handle member 2, and a wedge member 4 is secured to the leg 1a by a slidable ring or collar member 5 for a purpose as will be hereinafter set forth. The cam member 4 is preferably of a substantially circular cross sectional configuration and is interposed between the collar 3 and the leg 1b as clearly shown in the drawings.

A second gripper element 6 comprising a press plate 6a rigidly secured to or integral with a perpendicularly arranged gripping plate 6b providing a second gripping jaw for the tool is slidably and pivotally secured to the arm 1a by a suitable bracket member 7 and is disposed between the ring 5 and the arm 1b. Whereas the planes of the plate 6b and leg 1b lie in substantially the same direction, the planar angle therebetween as indicated at A in FIGURE a may be varied by the engagement of the wedge member 4 with the inner surface of the press plate 6a. Of course, the distance between the plate 6b and the leg 1b may be varied by adjusting the position of the bracket 7 on the leg 1a.

The outer end of the leg 6b is preferably beveled or sharpened as shown at 6c similar to the sharpened edge 1c and for the same purpose, and it is also desirable or preferable to provide a recess or notch 6d in the edge 6c for the same purpose as the notch 1d.

In use, the distance between the leg 1b and the plate 6d may be selected in accordance with the width of the plurality of cards (not shown) to be engaged by the tool 10 whereby the leg 1b and plate 6b may be inserted into the side-by-side arrangement of the cards and positioned against the outer surface of the outermost cards to be removed from the entire collection. The bevelled or sharpened edge 1c of the leg 1b and 6c of the plate 6b facilitating the separation of two adjacent cards for ease of insertion of the tool into the plurality of cards. When the tool has thus been positioned for spanning or encompassing the number or quantity of cards to be removed from the collection, the collar 3 may be manually moved along the leg 1z in a direction toward the ring or collar 5, and upon engagement therebetween, further movement of the collar 3 in the said direction will bring the wedge member 4 into engagement with the inner surface of the press plate 6a, as particularly shown in FIG. 1. The engagement of the wedge member 4 with the plate 6a causes the gripping element 6 to pivot in a clockwise direction about the pivot connection at bracket 7 as shown in FIG. 1. This action not only moves the gripping element 6 into a closer position with respect to the leg 1a, but also provides an increased gripping force therebetween whereby the cards (not shown) disposed between the leg 1b and plate 6b may be readily removed from the remaining collection of cards by lifting the tool 10 in a direction away therefrom.

In order to release the retrieved cards from the tool 10, and ring 5 may be moved manually along the leg 1a in a direction away from the leg 1b for releasing the engagement of the wedge member 4 from the press plate 6a, whereupon the gripping element 6 is free to pivot about the bracket connection 7 for releasing the pressure against the retrieved cards. In addition, the bracket 7 may be manually moved a- along the leg 1a in a direction away from the leg 1b for a complete disengagement of the retrieved cards.

Groups of cards (not shown) are frequently bundled or tied together by means of a rubber band, length of string, or the like (not shown). The notches or recesses 1d and 6d are provided for accommodating any such securing means which may be used in connection with cards being retrieved.

In order to replace the retrieved cards in the collection of cards, the operation may be reversed whereby the plurality of cards may once again be gripped between the leg 1b and the plate 6b and returned to the original position in the collection. Of course, the returned cards may be released by reducing the pressure against the cards by the leg 1b and plate 6b and withdrawing the tool 10 from the inserted position within the card collection. It will be readily apparent that the flat configuration of the plate 6b and leg 1b greatly improve the gripping engagement thereof with the cards being manipulated, thus providing an extremely useful and facile tool.

From the foregoing it will be apparent that the present invention provides a novel card retrieving tool having a pair of gripping elements providing substantially flat surfaces for engaging the exposed outermost surface of the cards to be retrieved or otherwise manipulated. The distance between the gripping elements and the pressure thereof against the engaged cards may be manually adjusted for facilitating holding of the cards and releasing of the cards as required. The gripping elements may be easily inserted between adjacent cards for facilitating the proper positioning of the tool for card retrieval, thus increasing the overall efficiency of the tool.

Whereas the present invention has been described in particular relation to the drawings attached hereto, it should be understood that other and further modifications, apart from those shown or suggested herein may be made within the spirit and scope of this invention.

What is claimed is:

1. A pick-up tool for objects and comprising first and second gripping elements movable in directions away from and toward each other for alternate engagement and disengagement with the object and slidably and pivotally secured together, wedge means slidably secured to the first of said gripping elements and selectively engageable with the second of said gripping elements for adjusting the distance and angular disposition therebetween, one of said gripping elements comprising a substantially L-shaped member having one leg thereof substantially flat to provide a first gripping jaw, and the other of said gripping elements being substantially L-shaped providing a pair of mutually perpendicular plates, one of said plates being a press plate engageable by said wedge means and the other of said plates being a second gripping jaw.

2. A pick-up tool for objects as set forth in claim 1 wherein said press plate is slidably and pivotally secured to the other gripping element for linear and pivotal movement with respect to the first gripping jaw upon engagement of the wedge means with the press plate for controlling the pressure engagement of the first and second gripping jaws with the object.

3. A pick-up tool for objects and comprising first and second gripping elements movable in directions away from and toward each other for alternate engagement and disengagement with the object and slidably and pivotally secured together, wedge means slidably secured to the first of said gripping elements and selectively engageable with the second of said gripping elements for adjusting the distance and angular disposition therebetween, one of said gripping elements comprising a substantially L-shaped member having one leg thereof substantially flat to provide a first gripping jaw, and the other of said gripping elements being substantially L-shaped providing a second substantially flat gripping jaw, and including collar means slidably secured to said first gripping element for selective engagement with the wedge means for activation thereof.

4. A pick-up tool for objects and comprising first and second gripping elements movable in directions away from and toward each other for alternate engagement and disengagement with the object and slidably and pivotally secured together, wedge means slidably secured to the first of said gripping elements and selectively engageable with the second of said gripping elements for adjusting the distance and angular disposition therebetween, one of said gripping elements comprising a substantially L-shaped member having one leg thereof substantially flat to provide a first gripping jaw, and the other of said gripping elements being substantially L-shaped providing a second substantially flat gripping jaw, and wherein the wedge means comprises a wedge member freely secured to a collar member, said collar member being slidably secured to one of said gripping elements for selective engagement with the other of said gripping elements to provide said angular and distance adjustment.

5. A pick-up tool for objects and comprising first and second gripping elements movable in directions away from and toward each other for alternate engagement and disengagement with the object and slidably and pivotally secured together, one of said gripping elements comprising a substantially L-shaped member having one let thereof substantially flat to provide a first gripping jaw, and the other of said gripping elements being substantially L-shaped providing a second substantially flat gripping jaw, and wherein the objects comprise a plurality of cards disposed in side-by-side disposition, and the outer end of each gripping element is bevelled for facilitating insertion of said gripping elements between adjacent cards for separating the selected card from the remaining cards.

* * * * *